(12) United States Patent
Babinski et al.

(10) Patent No.: US 9,142,235 B1
(45) Date of Patent: Sep. 22, 2015

(54) DISK DRIVE CHARACTERIZING MICROACTUATOR BY INJECTING SINUSOIDAL DISTURBANCE AND EVALUATING FEED-FORWARD COMPENSATION VALUES

(75) Inventors: Alexander Babinski, Laguna Niguel, CA (US); Lingfei Zhou, Lake Forest, CA (US); Nathan J. Santee, Mission Viejo, CA (US); Chuanwen Ji, Irvine, CA (US); Duc T. Phan, Saratoga, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 953 days.

(21) Appl. No.: 12/606,819

(22) Filed: Oct. 27, 2009

(51) Int. Cl.
*G11B 5/596* (2006.01)
(52) U.S. Cl.
CPC ..................................... *G11B 5/596* (2013.01)
(58) Field of Classification Search
None
See application file for complete search history.

(56) References Cited

U.S. PATENT DOCUMENTS

| | | | |
|---|---|---|---|
| 5,447,051 A | 9/1995 | Hanks et al. | |
| 5,852,524 A * | 12/1998 | Glover et al. | 360/51 |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,088,187 A * | 7/2000 | Takaishi | 360/78.05 |
| 6,091,564 A | 7/2000 | Codilian et al. | |
| 6,094,020 A | 7/2000 | Goretzki et al. | |
| 6,094,973 A | 8/2000 | Novotny | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,160,676 A * | 12/2000 | Takaishi | 360/78.05 |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,971 B1 | 4/2002 | Everett | |
| 6,369,972 B1 | 4/2002 | Codilian et al. | |
| 6,369,974 B1 | 4/2002 | Asgari et al. | |
| 6,462,896 B1 | 10/2002 | Codilian et al. | |
| 6,476,996 B1 | 11/2002 | Ryan | |
| 6,484,577 B1 | 11/2002 | Bennett | |
| 6,493,169 B1 | 12/2002 | Ferris et al. | |
| 6,496,324 B1 | 12/2002 | Golowka et al. | |
| 6,498,698 B1 | 12/2002 | Golowka et al. | |
| 6,507,450 B1 | 1/2003 | Elliott | |

(Continued)

*Primary Examiner* — K. Wong

(57) ABSTRACT

A disk drive is disclosed comprising a disk having a plurality of tracks, a head, and a voice coil motor (VCM) and a microactuator for actuating the head over the disk in response to a feed-forward compensation value. A sinusoidal disturbance is applied to the microactuator, and the resulting feed-forward compensation value is processed to characterize the microactuator.

24 Claims, 9 Drawing Sheets

(56) References Cited

U.S. PATENT DOCUMENTS

| | | |
|---|---|---|
| 6,510,752 B1 | 1/2003 | Sacks et al. |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,741,417 B2 * | 5/2004 | Hsin et al. ............... 360/78.05 |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,861,854 B1 | 3/2005 | Guo et al. |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,888,694 B2 * | 5/2005 | Guo et al. ............... 360/77.03 |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,956,711 B2 * | 10/2005 | Hanson et al. ............. 360/77.04 |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,019,938 B2 * | 3/2006 | Miyata et al. ............... 360/78.05 |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,106,552 B2 | 9/2006 | Hirano et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,124,654 B1 | 10/2006 | Davies et al. |
| 7,126,781 B1 | 10/2006 | Bennett |
| 7,136,257 B2 | 11/2006 | Zhang et al. |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,265,936 B1 | 9/2007 | Lee et al. |
| 7,283,321 B1 | 10/2007 | Sun et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,392,687 B2 | 7/2008 | Huang et al. |
| 7,423,837 B2 | 9/2008 | Hutsell |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |

(56) References Cited

U.S. PATENT DOCUMENTS

| | | |
|---|---|---|
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,538,971 B2 | 5/2009 | Sun et al. |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2008/0129305 A1 | 6/2008 | Perryman et al. |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

\* cited by examiner

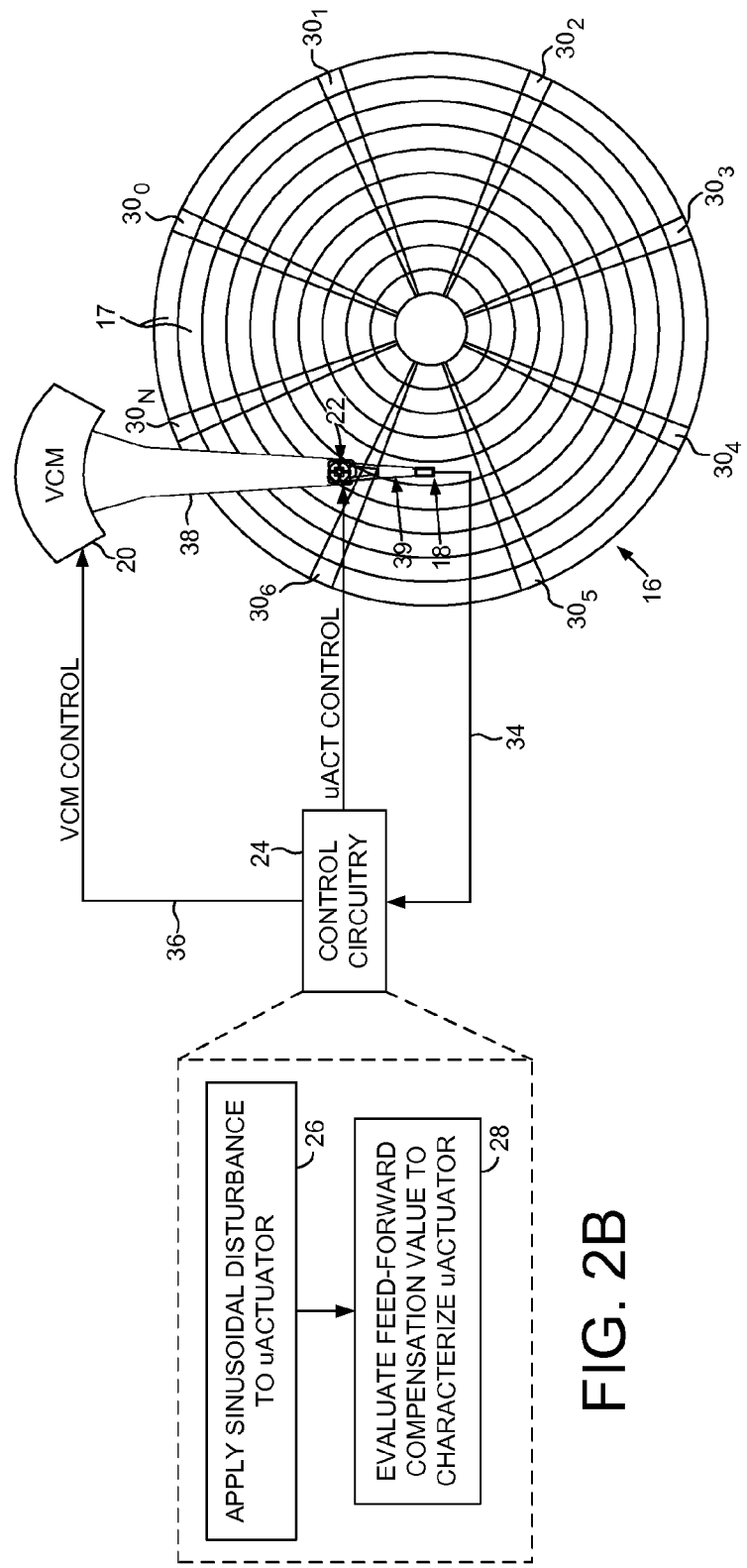

$$a_1(k+1) = a_1(k) - g_1 \cdot e(k) \cdot \cos(2\pi n_1 k/N)$$
$$b_1(k+1) = b_1(k) - g_1 \cdot e(k) \cdot \sin(2\pi n_1 k/N)$$

$$a_2(k+1) = a_2(k) - g_2 \cdot e(k) \cdot \cos(2\pi n_2 k/N)$$
$$b_2(k+1) = b_2(k) - g_2 \cdot e(k) \cdot \sin(2\pi n_2 k/N)$$

DISK DRIVE CHARACTERIZING MICROACTUATOR BY INJECTING SINUSOIDAL DISTURBANCE AND EVALUATING FEED-FORWARD COMPENSATION VALUES

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

FIG. 1 sows a prior art disk format 2 comprising a plurality of data tracks 4 defined by a number of servo sectors $6_0$-$6_N$ recorded around the circumference of each data track. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

As the density of the data tracks increases, a microactuator may be employed in combination with the VCM to improve the tracking performance of the servo system. Any suitable microactuator may be employed such as a suitable piezoelectric (PZT) actuator. It may be desirable to characterize the microactuator in order to calibrate a gain for the compensator, or disable the microactuator altogether if it is found defective.

BRIEF DESCRIPTION OF THE DRAWINGS

FIG. 2A shows a disk drive according to an embodiment of the present invention comprising a head actuated over a disk by a VCM and a microactuator.

FIG. 2B is a flow diagram according to an embodiment of the present invention wherein a sinusoidal disturbance is applied to the microactuator, and the resulting feed-forward compensation value is processed to characterize the microactuator.

DETAILED DESCRIPTION OF EMBODIMENTS OF THE INVENTION

Figure 1:
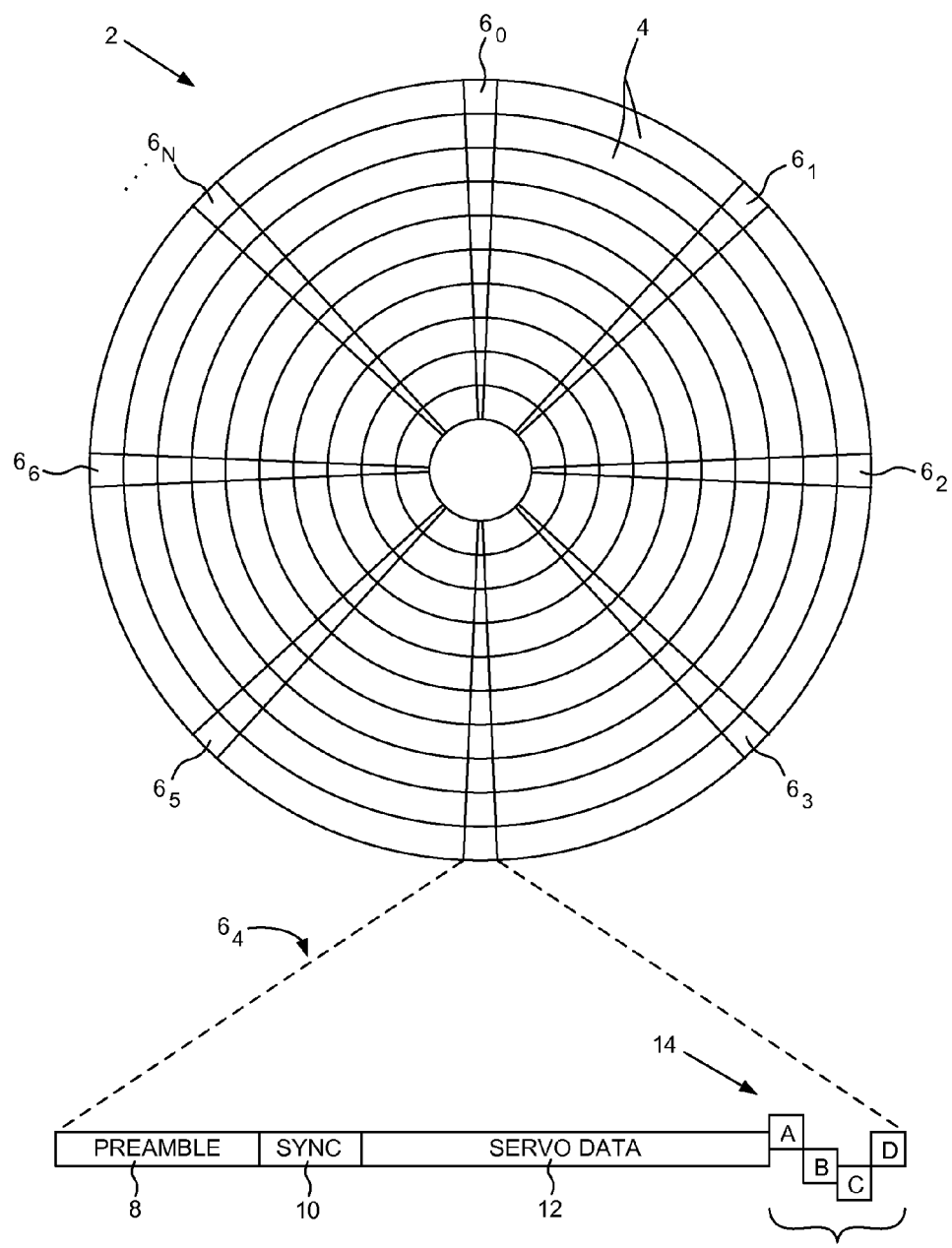
FIG. 1 shows a prior art disk format comprising a plurality of data tracks defined by embedded servo sectors.

FIG. 2A shows a disk drive according to an embodiment of the present invention comprising a disk 16 comprising a plurality of tracks 17, a head 18, and a voice coil motor (VCM) 20 and a microactuator 22 for actuating the head 18 over the disk 16 in response to a feed-forward compensation value. The disk drive further comprises control circuitry 24 operable to execute the flow diagram of FIG. 2B. A sinusoidal disturbance is applied to the microactuator (step 26), and the resulting feed-forward compensation value is processed to characterize the microactuator (step 28).

In the embodiment of FIG. 2A, the disk 16 comprises a plurality of servo sectors $30_0$-$30_N$ that define the plurality of tracks 17. The control circuitry 24 processes the read signal 34 to demodulate the servo sectors $30_0$-$30_N$ into a position error signal (PES). The PES is filtered with a suitable compensation filter to generate a control signal 36 applied to a voice coil motor (VCM) 20 which rotates an actuator arm 38 about a pivot in order to position the head 18 radially over the disk 16 in a direction that reduces the PES. The servo sectors $30_0$-$30_N$ may comprise any suitable position information, such as a track address for coarse positioning and servo bursts for fine positioning.

Any suitable microactuator 22 may be employed in the embodiments of the present invention, such as a piezoelectric (PZT) actuator which transduces electrical energy into a mechanical displacement. In the embodiment of FIG. 2A, the microactuator 22 is integrated with and actuates the suspension 39 that couples the head 18 to the actuator arm 38. However, the microactuator may be integrated at any suitable location, such as with a slider to which the head 18 is mounted. In addition, the microactuator 22 may comprise multiple actuators (e.g., multiple PZTs) that may operate to move the head 18 in different radial directions.

Any suitable feed-forward compensation value may be evaluated in order to characterize the microactuator 22. In an embodiment shown in FIG. 3A, the feed-forward compensation value comprises coefficients (a,b) of a sinusoid 40, wherein k represents a servo sector 30, out of N servo sectors 30$_N$. A VCM feed-forward signal 42 is combined 44 with a VCM control signal 46 generated by a VCM compensator 48. A microactuator compensator 50 generates a microactuator control signal 52 applied to the microactuator 22. When the head 18 reads a servo sector 30, a read channel 54 demodulates the read signal 34 into an estimated position 56 of the head 18. The estimated position 56 is compared 58 to a reference position 60 to generate a PES 62. The PES 62 is processed to adapt the coefficients (a,b) of the feed-forward sinusoid 40, processed by the VCM compensator 48 to generate the VCM control signal 46, and processed by the microactuator compensator 50 to generate the microactuator control signal 52.

Figure 3A:
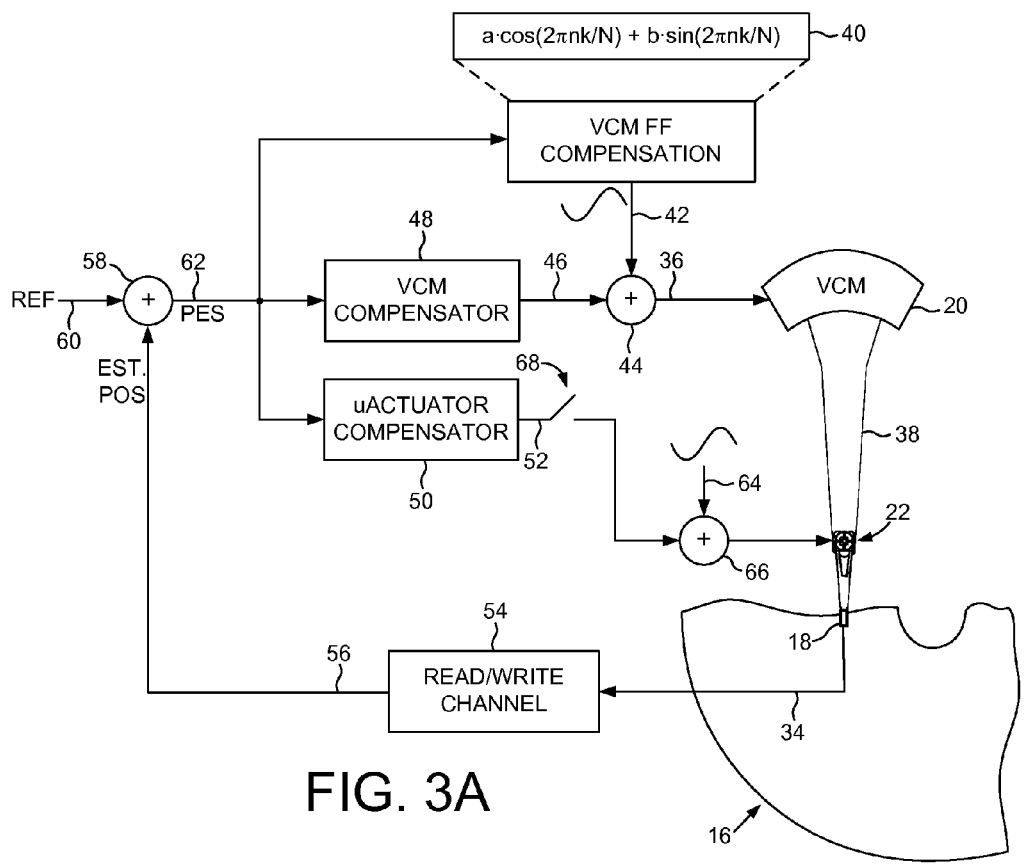
FIG. 3A shows an embodiment of the present invention wherein a microactuator compensator is disabled while applying the sinusoidal disturbance to the microactuator, and the feed-forward compensation value comprises a coefficient of a sinusoid.
Figure 3B:
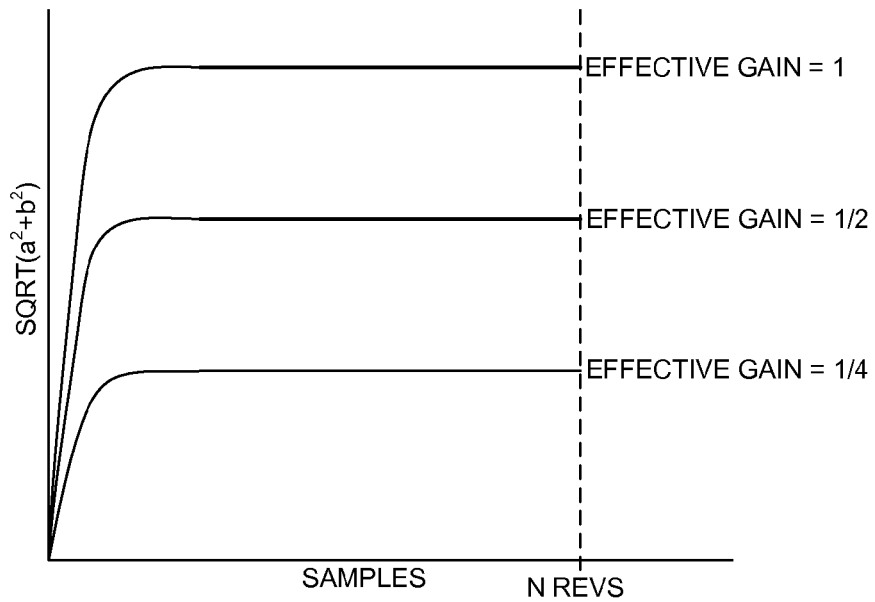
FIGS. 3B-3C illustrate how the coefficients of a feed-forward sinusoid adapt for different microactuator effective gain values while applying the sinusoidal disturbance to the microactuator according to an embodiment of the present invention.
Figure 3C:
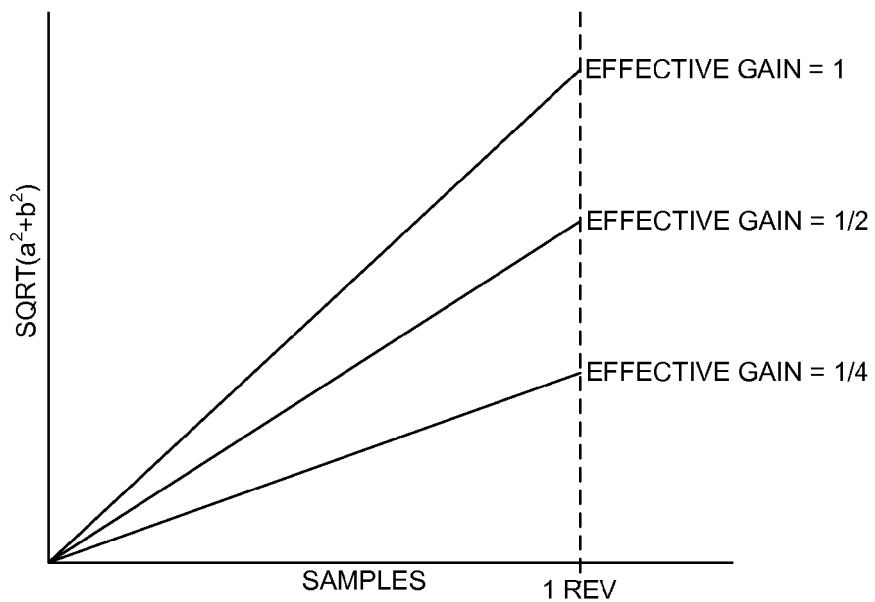

In the embodiment of FIG. 3A, when characterizing the microactuator 22 a sinusoidal disturbance 64 is applied to the microactuator 22 (through adder 66) while disabling the microactuator compensator 50 by opening switch 68. The affect of the sinusoidal disturbance 64 on the feed-forward compensation value is then evaluated to characterize the microactuator 22. For example, a magnitude of the coefficients (a,b) of the feed-forward sinusoid 40 may be evaluated to determine an effective gain of the microactuator 22. FIG. 3B illustrates different magnitudes of the coefficients (a,b) for corresponding effective gain values of the microactuator 22 after adapting the coefficients (a,b) to a steady state value over multiple disk revolutions. In one embodiment, in order to expedite the characterization procedure the coefficients (a,b) are evaluated after a single disk revolution as illustrated in FIG. 3C. That is, the coefficients (a,b) may adapt sufficiently to characterize the microactuator after a single disk revolution. In one embodiment, the change in the magnitude of the coefficients is evaluated since the coefficients (a,b) may have a non-zero value prior to applying the sinusoidal disturbance 64. The change in the magnitude of the coefficients reflects an effective gain of the microactuator since there are multiple components along the controlled plant that may affect the gain of the plant.

Figure 3D:
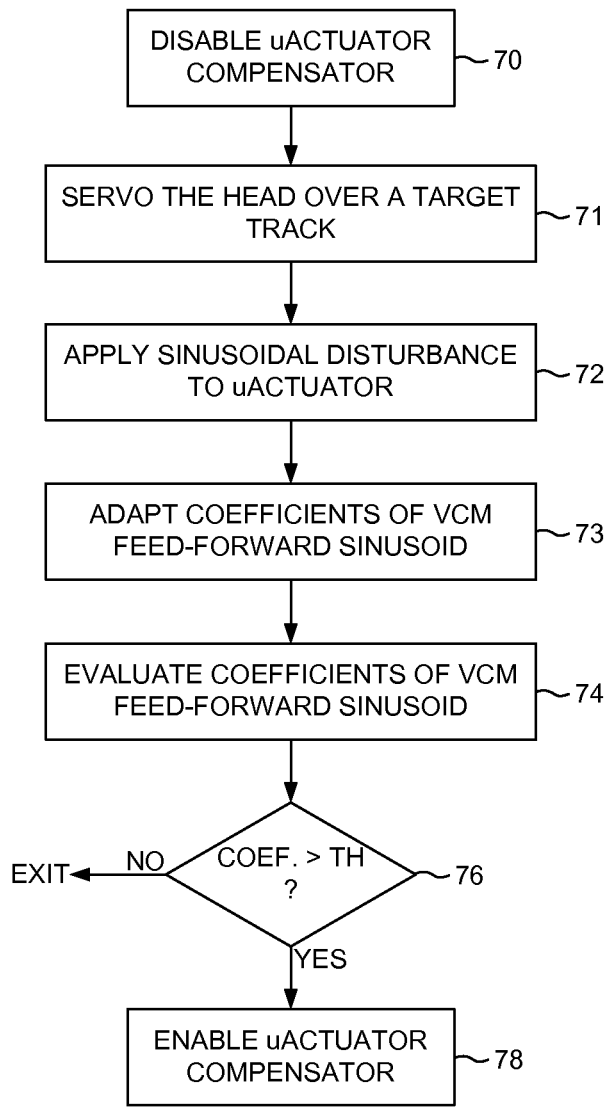
FIG. 3D is a flow diagram according to an embodiment of the present invention wherein if a magnitude of the coefficients is less than a threshold, the microactuator compensator remains disabled.

FIG. 3D shows a flow diagram according to an embodiment of the present invention wherein after disabling the microactuator compensator (step 70) the head is servoed over a target track (step 71). A sinusoidal disturbance is applied to the microactuator (step 72), and the coefficients of the VCM feed-forward sinusoid are adapted to compensate for the resulting disturbance in the PES (step 73). After the coefficients have adapted for a predetermined interval, the coefficients of the VCM feed-forward sinusoid are evaluated (step 74) wherein if a magnitude of the coefficients exceeds a threshold (step 76), the microactuator is considered operating normally and therefore the microactuator compensator is enabled (step 78). If the magnitude of the coefficients does not exceed the threshold (step 76), then the microactuator is considered defective and therefore the microactuator compensator remains disabled so that the microactuator is not used during normal operation.

In an alternative embodiment, the magnitude of the coefficients may be used to adjust a gain of the microactuator compensator. For example, if the coefficients of the VCM feed-forward sinusoid indicate the effective gain of the microactuator is low, the gain of the microactuator compensator may be increased rather than disable the microactuator.

Figure 4:
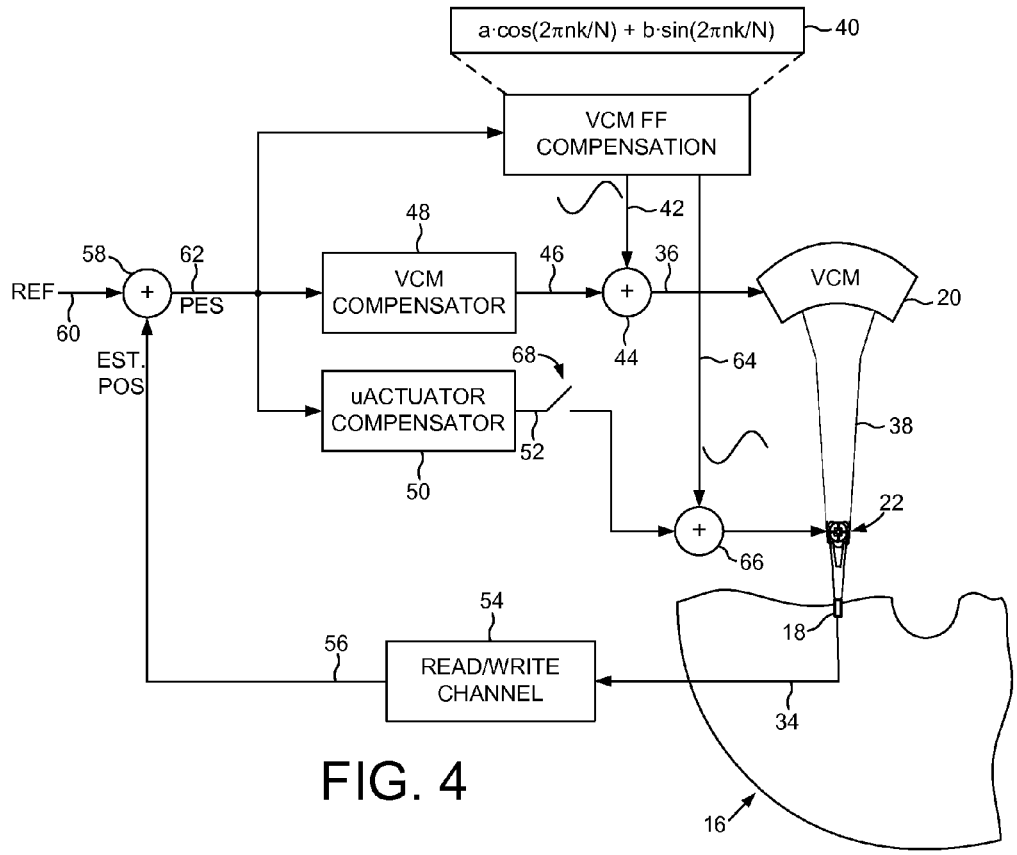
FIG. 4 shows an embodiment of the present invention wherein the algorithm for generating the feed-forward sinusoid is also used to generate the sinusoidal disturbance applied to the microactuator.

The sinusoidal disturbance 64 may be generated in any suitable manner. In an embodiment illustrated in FIG. 4, the sinusoidal disturbance 64 is generated using the same algorithm for generating the feed-forward sinusoid 40. Both sinusoids may be generated in any suitable manner, such as with a lookup table or a mathematical function. In one embodiment, the frequency of the sinusoidal disturbance 64 is generated at the same frequency as the feed-forward sinusoid 40. In yet another embodiment, the coefficients are selected such that the phase of the sinusoidal disturbance 64 substantially matches the initial phase of the feed-forward sinusoid 40. In one embodiment, this is implemented by duplicating the coefficients (a,b) of the feed-forward sinusoid 40 (prior to applying the sinusoidal disturbance to the microactuator) and then increasing the coefficients for generating the sinusoidal disturbance. While the magnitude and phase of the feed-forward signal 42 will change as the coefficients (a,b) adapt, the magnitude and phase of the sinusoidal disturbance 64 will remain constant during the characterization process.

Figure 5:
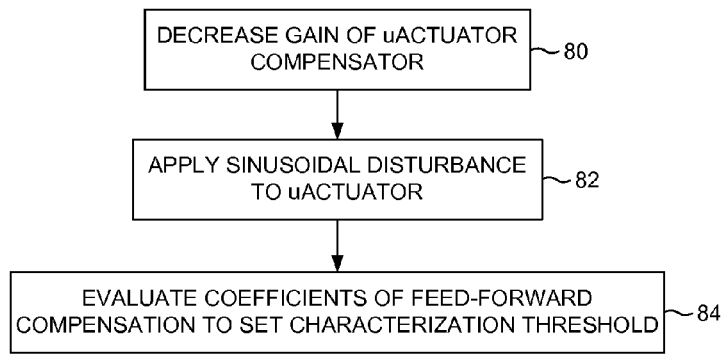
FIG. 5 is a flow diagram according to an embodiment of the present invention for calibrating a characterization threshold used to enable/disable the microactuator.

FIG. 5 is a flow diagram according to an embodiment of the present invention for calibrating a characterization threshold for the microactuator, such as a gain threshold for disabling the microactuator as described above. In one embodiment, a nominal threshold is calibrated using a disk drive with a normal, functioning microactuator. The nominal threshold is then copied to a family of production disk drives during manufacturing. During the calibration procedure, the gain of the microactuator is decreased (step 80) and a sinusoidal disturbance applied to the microactuator (step 82). The coefficients (a,b) of the feed-forward sinusoid are then evaluated to set the characterization threshold. For example, in one embodiment the gain is decreased until a three sigma for the track miss-registration (TMR) reaches a point where the VCM alone is better than if it where augmented by the microactuator, wherein the magnitude of the coefficients (a,b) at the corresponding gain is selected as the characterization threshold (disabling threshold).

Figures 6A, 6B, 6C:
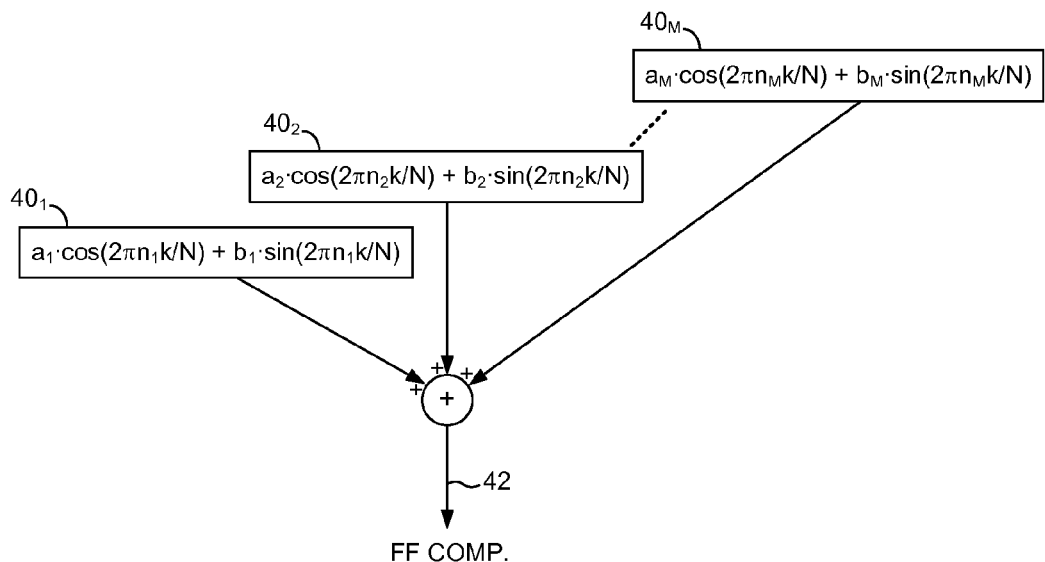
FIGS. 6A-6C shows an embodiment of the present invention wherein the feed-forward compensation value comprises multiple sinusoids generated at different frequencies.

FIG. 6A shows an embodiment of the present invention wherein the VCM feed-forward signal 42 comprises a plurality of feed-forward sinusoids 40$_1$-40$_M$ generated at different frequencies (as determined from $n_1$, $n_2$, etc) and magnitudes (as determined from $a_1,b_1$, $a_2,b_2$, etc.) in order to compensate for a number of repeatable disturbances (e.g., 1×, 2×, etc). During normal operation, the coefficients for each feed-forward sinusoid 40, are adapted using a suitable learning algorithm, such as shown in the example of FIGS. 6B and 6C. When characterizing the microactuator, the coefficients are adapted in response to the sinusoidal disturbance applied to the microactuator. That is, if the microactuator is functioning properly, the disturbance in the PES due to the sinusoidal disturbance applied to the microactuator will cause a corresponding change in the coefficients of the feed-forward sinusoid at the frequency of the sinusoidal disturbance. In one embodiment, the sinusoidal disturbance may be applied at several different frequencies and the corresponding feed-forward sinusoids evaluated (e.g., averaged) in order to characterize the microactuator.

Figure 6D:
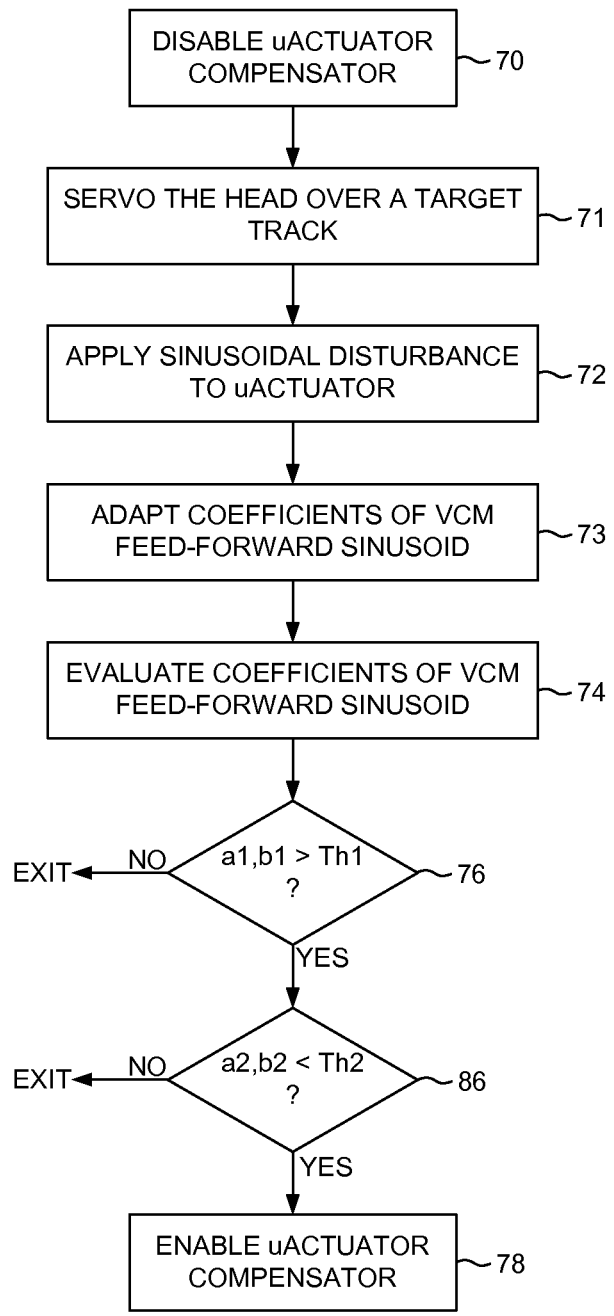
FIG. 6D is a flow diagram according to an embodiment of the present invention wherein if the magnitude of coefficients of a feed-forward sinusoid at a frequency other than that of the sinusoidal disturbance are greater than a threshold, the microactuator compensator remains disabled.

In one embodiment, the magnitude of the feed-forward sinusoids at frequencies other than the frequency of the sinusoidal disturbance are evaluated to determine the linearity and stability of the microactuator servo loop. This embodiment is illustrated in the flow diagram of FIG. 6D which extends on the flow diagram of FIG. 3D. If the magnitude of the coefficients (e.g., $a_2,b_2$) of a feed-forward signal at a frequency different from the sinusoidal disturbance is greater than a threshold (step 86), it may indicate the microactuator servo loop is exhibiting a non-linear or unstable behavior and therefore the microactuator is not enabled.

Figure 7A:
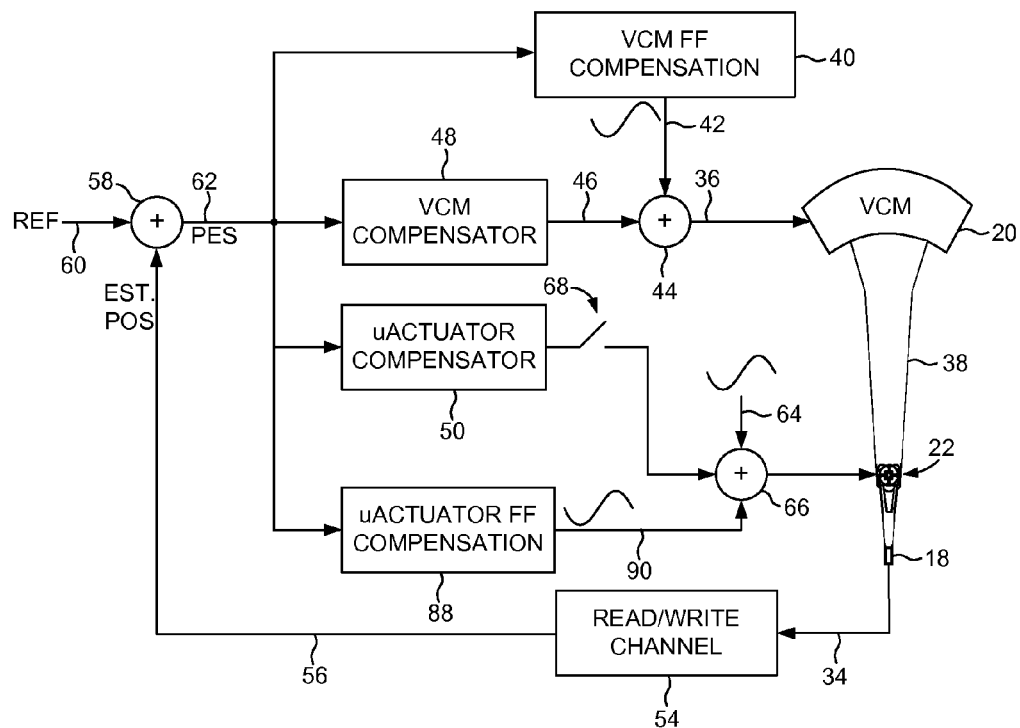
FIG. 7A shows an embodiment of the present invention wherein feed-forward compensation values are generated for the microactuator.
Figure 7B:
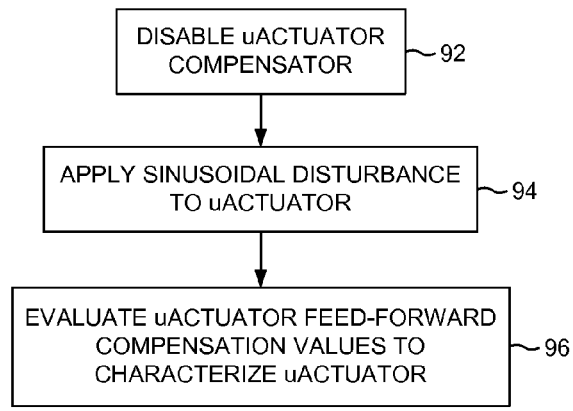
FIG. 7B shows a flow diagram according to an embodiment of the present invention wherein while applying the sinusoidal disturbance the microactuator feed-forward compensation values are evaluated to characterize the microactuator.

FIG. 7A shows control circuitry according to an embodiment of the present invention comprising a microactuator feed-forward compensation block 88 for generated a microactuator feed-forward signal 90. In the flow diagram of FIG. 7B, when characterizing the microactuator the microactuator compensator 50 is disabled (step 92) and a sinusoidal disturbance applied to the microactuator (step 94). A microactuator feed-forward compensation value (e.g., a coefficient for generating feed-forward signal 90) is evaluated in order to characterize the microactuator (step 96). That is, if the microactuator is operating properly, or if the gain needs adjusting, it will be reflected in the microactuator feed-forward compensation value. In one embodiment, both a VCM feed-forward compensation value and a microactuator feed-forward compensation value may be evaluated in order to characterize the microactuator.

The microactuator may be characterized at any suitable time, such as once during manufacturing of the disk drive and/or while the disk drive is deployed in-the-field. In one embodiment, the microactuator is characterized (and optionally adjusted) each time the disk drive is powered on, and in another embodiment, the microactuator may be characterized at a predetermined interval (e.g., once every hour). In the embodiment described above with reference to FIG. 3C, the microactuator is characterized after the coefficients of the feed-forward sinusoid(s) have been adapted over a single revolution of the disk. In other embodiments, the coefficients may be allowed to adapt longer before characterizing the microactuator (e.g., after multiple disk revolutions).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a disk comprising a plurality of tracks;
a head;
a voice coil motor (VCM) and a microactuator for actuating the head over the disk in response to a feed-forward compensation value; and
control circuitry operable to:
apply a sinusoidal disturbance to the microactuator; and
process the resulting feed-forward compensation value to characterize the microactuator.

2. The disk drive as recited in claim 1, wherein the control circuitry is further operable to:
adapt the feed-forward compensation value while servoing the head over one of the tracks; and
process the adapted feed-forward compensation value to characterize the microactuator.

3. The disk drive as recited in claim 1, wherein:
the control circuitry comprises a microactuator compensator; and
the control circuitry is further operable to disable the microactuator compensator while applying the sinusoidal disturbance to the microactuator.

4. The disk drive as recited in claim 1, wherein the control circuitry is further operable to generate a VCM control signal in response to the feed-forward compensation value.

5. The disk drive as recited in claim 1, wherein the feed-forward compensation value comprises a coefficient of a first sinusoid.

6. The disk drive as recited in claim 5, wherein the control circuitry is further operable to compare a magnitude of the first sinusoid to a first threshold.

7. The disk drive as recited in claim 6, wherein the control circuitry is further operable to disable the microactuator when the magnitude of the first sinusoid is less than the first threshold.

8. The disk drive as recited in claim 5, wherein the control circuitry is further operable to adapt the coefficient in response to a position error signal while applying the sinusoidal disturbance to the microactuator.

9. The disk drive as recited in claim 5, wherein a frequency of the first sinusoid substantially matches a frequency of the sinusoidal disturbance.

10. The disk drive as recited in claim 9, wherein the control circuitry is further operable to generate the sinusoidal disturbance and the first sinusoid using a common algorithm.

11. The disk drive as recited in claim 9, wherein the control circuitry is further operable to:
generate the feed-forward compensation value comprising a second sinusoid comprising a frequency substantially different from the frequency of the sinusoidal disturbance; and
disable the microactuator when a magnitude of the second sinusoid is greater than a second threshold.

12. The disk drive as recited in claim 1, wherein the control circuitry is further operable to generate a microactuator control signal in response to the feed-forward compensation value.

13. A method of operating a disk drive, the disk drive comprising a disk, a head, a voice coil motor (VCM) and a microactuator for actuating the head over the disk in response to a feed-forward compensation value, the method comprising:
applying a sinusoidal disturbance to the microactuator; and
processing the resulting feed-forward compensation value to characterize the microactuator.

14. The method as recited in claim 13, further comprising:
adapting the feed-forward compensation value while servoing the head over a track on the disk; and
processing the adapted feed-forward compensation value to characterize the microactuator.

15. The method as recited in claim 13, wherein:
the disk drive further comprises a microactuator compensator; and
the method further comprising disabling the microactuator compensator while applying the sinusoidal disturbance to the microactuator.

16. The method as recited in claim 13, further comprising generating a VCM control signal in response to the feed-forward compensation value.

17. The method as recited in claim 13, wherein the feed-forward compensation value comprises a coefficient of a first sinusoid.

18. The method as recited in claim 17, further comprising comparing a magnitude of the first sinusoid to a first threshold.

19. The method as recited in claim 18, further comprising disabling the microactuator when the magnitude of the first sinusoid is less than the first threshold.

20. The method as recited in claim 17, further comprising adapting the coefficient in response to a position error signal while applying the sinusoidal disturbance to the microactuator.

21. The method as recited in claim 17, wherein a frequency of the first sinusoid substantially matches a frequency of the sinusoidal disturbance.

22. The method as recited in claim 21, further comprising generating the sinusoidal disturbance and the first sinusoid using a common algorithm.

23. The method as recited in claim 21, further comprising:
generating the feed-forward compensation value comprising a second sinusoid comprising a frequency substantially different from the frequency of the sinusoidal disturbance; and
disabling the microactuator when a magnitude of the second sinusoid is greater than a second threshold.

24. The method as recited in claim 13, further comprising generating a microactuator control signal in response to the feed-forward compensation value.

\* \* \* \* \*